US011038966B1

(12) United States Patent
Repetti

(10) Patent No.: US 11,038,966 B1
(45) Date of Patent: Jun. 15, 2021

(54) REMOTE DEVICE OPERATION

(71) Applicant: Arm IP Limited, Cambridge (GB)

(72) Inventor: Adriano Repetti, Fulbourn (GB)

(73) Assignee: Arm IP Limited, Cambridge (GB)

( * ) Notice: Subject to any disclaimer, the term of this patent is extended or adjusted under 35 U.S.C. 154(b) by 0 days.

(21) Appl. No.: 16/861,198

(22) Filed: Apr. 28, 2020

(51) Int. Cl.
*H04L 29/00* (2006.01)
*H04L 29/08* (2006.01)

(52) U.S. Cl.
CPC ................. *H04L 67/125* (2013.01)

(58) Field of Classification Search
CPC .................................................. H04L 67/125
See application file for complete search history.

(56) References Cited

U.S. PATENT DOCUMENTS

| 7,398,209 | B2 | 7/2008 | Kennewick et al. |
|---|---|---|---|
| 7,603,381 | B2 | 10/2009 | Burke et al. |
| 7,949,529 | B2 | 5/2011 | Weider et al. |
| 8,280,009 | B2 | 10/2012 | Stepanian |
| 8,539,567 | B1 | 9/2013 | Logue et al. |
| 9,231,904 | B2 | 1/2016 | Johnson et al. |
| 9,270,761 | B1 | 2/2016 | Logue et al. |
| 9,313,863 | B2 | 4/2016 | Hershberg et al. |
| 9,400,943 | B2 | 7/2016 | Sharma et al. |
| 9,439,068 | B2 | 9/2016 | Chen et al. |
| 9,462,041 | B1 | 10/2016 | Hagins et al. |
| 9,600,645 | B2 | 3/2017 | Fadell et al. |
| 9,606,817 | B1 | 3/2017 | Efstathopoulos |
| 9,633,004 | B2 | 4/2017 | Giuli et al. |
| 9,854,063 | B2 | 12/2017 | Borzycki et al. |
| 10,003,654 | B2 | 6/2018 | Chen et al. |
| 10,299,091 | B2 | 5/2019 | Schoppmeier |
| 10,338,895 | B2 | 7/2019 | Zhang et al. |
| 10,353,939 | B2 | 7/2019 | Shaashua et al. |
| 10,440,863 | B1* | 10/2019 | Shelnutt .............. H05K 7/1497 |
| 2004/0054690 | A1 | 3/2004 | Hillerbrand et al. |
| 2004/0243534 | A1* | 12/2004 | Culter .................. G06F 9/4411 |
| 2005/0246703 | A1* | 11/2005 | Ahonen ............... H04W 8/245 |
| | | | 717/172 |
| 2006/0200253 | A1 | 9/2006 | Hoffberg et al. |

(Continued)

FOREIGN PATENT DOCUMENTS

| CN | 202257235 U | 5/2012 |
|---|---|---|
| CN | 104468815 A | 3/2015 |

(Continued)

OTHER PUBLICATIONS

Cheng Zheng., et al., "A Study of Intents Resolving for Service Discovery," Proceedings of IEEE 18th International Conference on Computer Supported Cooperative Work in Design, 2014, 6 pages.

(Continued)

*Primary Examiner* — John E Breene
*Assistant Examiner* — Eyob Hagos
(74) *Attorney, Agent, or Firm* — Patterson Thuente Pedersen, P.A.

(57) ABSTRACT

A coordinator device comprising communication circuitry configured to connect the coordinator device to a first remote device and to receive remote device description data for the first remote device from the first remote device. The coordinator device comprises processing circuitry configured to enable execution of firmware for the first remote device outside of the first remote device.

17 Claims, 4 Drawing Sheets

(56) References Cited

U.S. PATENT DOCUMENTS

| | | |
|---|---|---|
| 2009/0089044 A1 | 4/2009 | Cooper et al. |
| 2011/0301943 A1 | 12/2011 | Patch |
| 2012/0016678 A1 | 1/2012 | Gruber et al. |
| 2012/0209951 A1 | 8/2012 | Enns et al. |
| 2012/0265528 A1 | 10/2012 | Gruber et al. |
| 2013/0152092 A1 | 6/2013 | Yadgar |
| 2013/0223279 A1 | 8/2013 | Tinnakornsrisuphap et al. |
| 2013/0258918 A1 | 10/2013 | Rudland |
| 2013/0275164 A1 | 10/2013 | Gruber et al. |
| 2014/0052680 A1 | 2/2014 | Nitz et al. |
| 2014/0223421 A1* | 8/2014 | Carter ................. A61B 5/0024 717/168 |
| 2014/0278349 A1 | 9/2014 | Grieves et al. |
| 2014/0310001 A1 | 10/2014 | Kalns et al. |
| 2015/0045960 A1 | 2/2015 | Caron et al. |
| 2015/0067173 A1 | 3/2015 | Igarashi |
| 2015/0109104 A1 | 4/2015 | Fadell et al. |
| 2015/0120641 A1 | 4/2015 | Soon-Shiong et al. |
| 2015/0156266 A1 | 6/2015 | Gupta |
| 2015/0195365 A1 | 7/2015 | Choi et al. |
| 2015/0339917 A1 | 11/2015 | Messing et al. |
| 2015/0342011 A1* | 11/2015 | Brochu ................. H05B 47/10 315/294 |
| 2016/0095192 A1 | 3/2016 | Vangeel et al. |
| 2016/0216957 A1* | 7/2016 | Yoon .................... G06F 9/4416 |
| 2016/0225372 A1 | 8/2016 | Cheung et al. |
| 2016/0241660 A1 | 8/2016 | Nhu |
| 2016/0300138 A1 | 10/2016 | Volk |
| 2016/0328719 A1 | 11/2016 | Ananchaperumal et al. |
| 2017/0013029 A1 | 1/2017 | Banerjee et al. |
| 2017/0031333 A1 | 2/2017 | Luff et al. |
| 2017/0139556 A1 | 5/2017 | Josephson |
| 2017/0192770 A1* | 7/2017 | Ujiie ....................... G06F 8/654 |
| 2017/0195267 A1 | 7/2017 | Ghafourifar et al. |
| 2017/0208139 A1 | 7/2017 | Li et al. |
| 2017/0279894 A1 | 9/2017 | Chen et al. |
| 2018/0048710 A1 | 2/2018 | Altin |
| 2018/0091621 A1 | 3/2018 | Kuo et al. |
| 2018/0115901 A1* | 4/2018 | Nenov .............. H04W 12/1202 |
| 2018/0116004 A1 | 4/2018 | Britt et al. |
| 2018/0139718 A1 | 5/2018 | Marten et al. |
| 2018/0205601 A1* | 7/2018 | Lee ......................... G06F 8/654 |
| 2018/0299914 A1 | 10/2018 | Caron et al. |
| 2019/0108353 A1 | 4/2019 | Sadeh et al. |
| 2019/0138295 A1* | 5/2019 | Agerstam ................. G06F 8/65 |
| 2019/0281118 A1* | 9/2019 | Kim .................. H04L 29/08558 |
| 2019/0379764 A1* | 12/2019 | Andreola ................. H04L 12/66 |
| 2020/0077495 A1* | 3/2020 | Harrison ................. H05B 45/20 |

FOREIGN PATENT DOCUMENTS

| | | | |
|---|---|---|---|
| CN | 106557339 A * | 4/2017 | |
| WO | WO-2014190053 A1 | 11/2014 | |
| WO | WO-2015061678 A1 | 4/2015 | |

OTHER PUBLICATIONS

Cheng Zheng., et al., "An Adaptive Intent Resolving Scheme for Service Discovery and Integration," Journal of Universal Computer Science, 2014, vol. 20 (13), pp. 1791-1812.

Cheng Zheng., et al., "An Intents-based Approach for Service Discover and Integration," Proceedings of IEEE 17th International Conference on Computer Supported Cooperative Work in Design, 2013, 6 pages.

Cheng Zheng., et al., "Design and Implementation of Intents User Agent," Proceedings of the 2013 IEEE 17th International Conference on Computer Supported Cooperative Work in Design, 2013, 6 pages.

Examination Report for GB Application No. 1513563.5, dated Apr. 4, 2019, 4 pages.

NXP Laboratories UK, "ZigBee Cluster Library User Guide," JN-UG-3077, revision 2.1, Feb. 6, 2015, 832 pages.

NXP Laboratories UK, "ZigBee PRO Stack User Guide," JN-UG-3048, revision 2.5, Jun. 10, 2014, 418 pages.

Perera C., et al., "Context Aware Computing for the Internet of Things: A Survey," IEEE Communication Surveys and Tutorials, Jan. 2014, vol. 16, No. 1, pp. 414-454.

Search Report for GB Application No. 1513653.5, dated Mar. 11, 2016, 7pages.

W3C Working Group, "Web Intents," published on May 23, 2013, 11 pages.

ZigBee Alliance, "ZigBee Cluster Library Specification," Document 14-0142, ZigBee Document: 075123, Revision 5, released on Mar. 18, 2015, 967 pages.

* cited by examiner

REMOTE DEVICE OPERATION

The present techniques generally relate to methods, apparatus and systems for remote device operation, and in particular to increasing efficiency in the operation of remote devices.

Cloud computing services are becoming more common. More and more devices are being connected to the cloud, for example as part of the "Internet of Things" (IoT). For example, devices such as temperature sensors, healthcare monitors and electronic door locks can be connected to the cloud so that they can be accessed and controlled using remote systems. For example, a door may be remotely opened from a remote platform, or data from a temperature sensor or healthcare monitor may be aggregated at a remote location and accessed from another device. Hence, there is an increasing amount of data being collected by cloud platforms and their providers.

Remote devices which can be connected to the cloud comprise electronics boards which provide features such as timers, real-time clocks, displays, input devices and other features which are required in order to operate in the field and to provide the functionality required by a user in their operation. Such features add cost to the remote devices and complexity to a system comprising the remote devices, both of which may be considerable when networks of hundreds or thousands of remote devices are required in a system.

It would therefore be desirable to provide an alternative system.

According to a first aspect of the present technique, there is provided a coordinator device comprising: communication circuitry configured to connect the coordinator device to a first remote device and to receive remote device description data for the first remote device from the first remote device; and processing circuitry configured to enable execution of firmware for the first remote device outside of the first remote device.

According to a second aspect of the present technique, there is provided a system comprising a first remote device; and a coordinator device, the coordinator device comprising: communication circuitry configured to connect the coordinator device to the first remote device and to receive remote device description data for the first remote device from the first remote device; and processing circuitry configured to enable execution of firmware for the first remote device outside of the first remote device.

According to a third aspect of the present technique, there is provided a method comprising: detecting connection of a first remote device to a coordinator device; receiving remote device description data for the first remote device from the first remote device; and executing firmware for the first remote device outside of the first remote device.

As will be appreciated by one skilled in the art, the present techniques may be embodied as an apparatus, a system, a method or a computer program. Accordingly, present techniques may take the form of an entirely hardware embodiment, an entirely software embodiment, or an embodiment combining software and hardware aspects.

Embodiments will now be described with reference to the accompanying figures of which:

Figure 1:
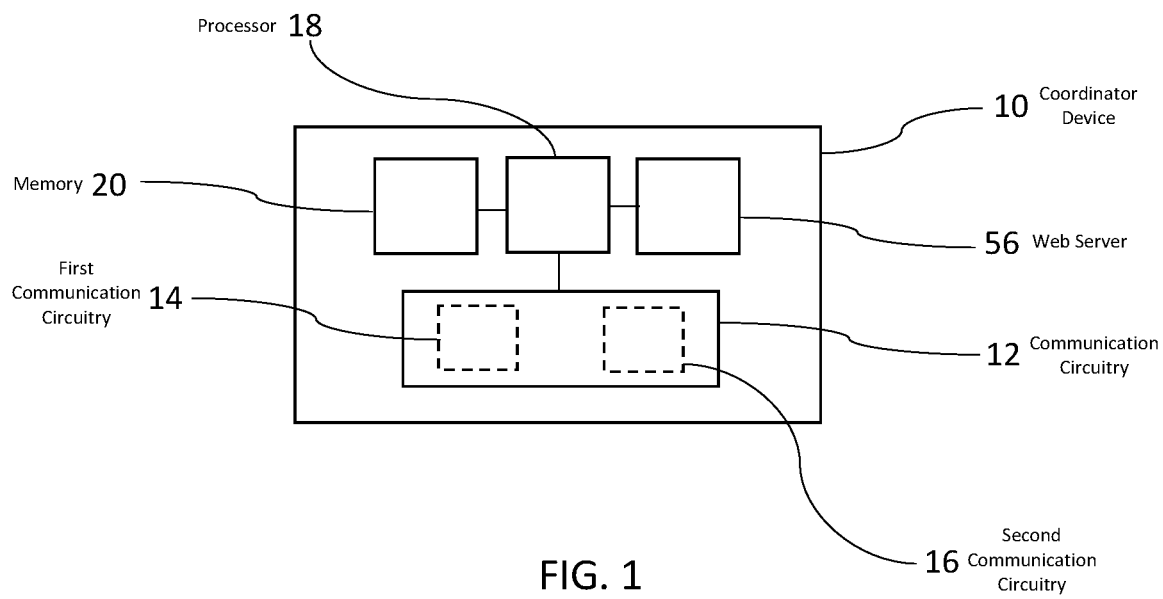
FIG. 1 illustrates a schematic diagram of an apparatus according to various examples.
Figure 2:
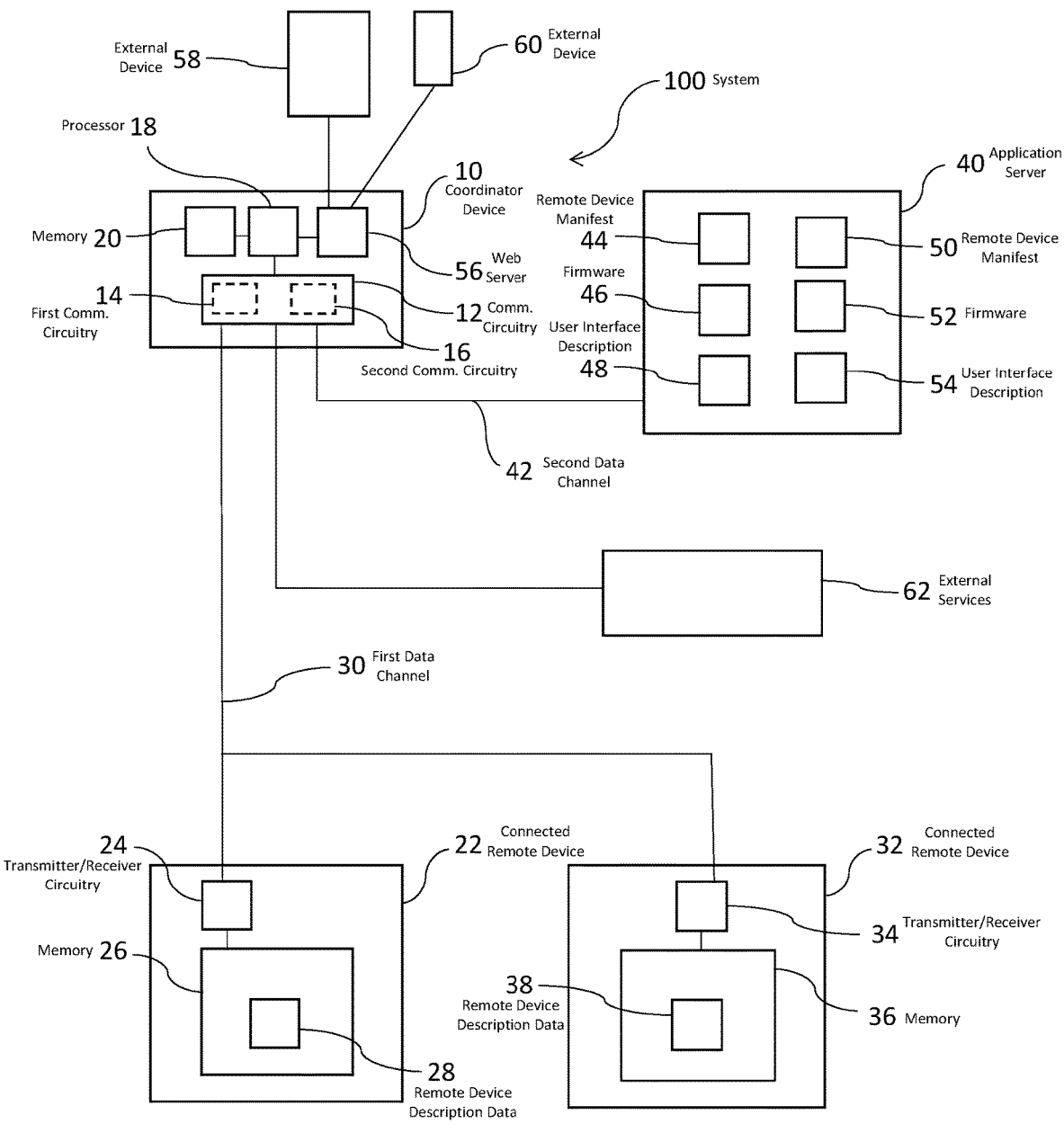
FIG. 2 illustrates a schematic diagram of an example system according to various examples.

FIG. 1 illustrates a schematic diagram of an apparatus 10, where the apparatus 10 may be in the form of a coordinator device 10, for controlling and/or coordinating the operation of remote devices 22, 32. FIG. 2 illustrates a schematic diagram of an example system 100 comprising a coordinator device 10, for controlling and/or coordinating the operation of remote devices 22, 32, an application server 40, external services 62, and remote devices 22, 32.

The remote devices 22, 32 may be known as Internet of Things (IoT) devices. The remote devices 22, 32 of the present invention may be considered to be dumb devices, that is, devices which lack features such as a timer, a real time clock, a user interface which may include a display and input devices, and so on. The remote devices 22, 32 may be low cost and/or legacy devices, and in particular can be devices without the full power and resources of a modern microcontroller unit. The remote devices 22, 32 may comprise transmitter/receiver circuitry 24, 34 for communicating with the coordinator device 10. The remote devices 22, 32 may comprise memory 26, 36 for storing remote device description data 28, 38, which may comprise one or more of vendor identification, model identification for the respective remote device and serial number of the respective remote device. Such remote device description data 28, 38 may provide information to allow identification of a firmware 46, 52 for the respective remote device 22, 32.

The coordinator device 10 may comprise an electronics board providing an operating system for running firmware of one or more remote devices 22, 32. The coordinator device 10 may provide an ARM Mbed OS, ARM Mbed Linux OS, or similar OS, which is capable of running the firmware of various remote devices 22, 32 connected thereto.

The firmware 46, 52 may be code which is machine independent, enabling interpretation, compilation, and execution on different processors having different instruction set architectures or by a virtual machine. The firmware 46, 52, may be in a portable code format. The firmware 46, 52 may be an intermediate representation or an intermediate language to be used by a compiler or virtual machine, where the intermediate representation may represent source code. The firmware 46, 52 may provide an instruction set for use or execution by a virtual machine. The firmware 46, 52 may be p-code, which is an assembly language of a hypothetical processor. The firmware 46, 52 may be bytecode. The firmware 46, 52 may be pseudo-code for an abstract virtual machine. The pseudo-code may be interpretable by different processors or by a virtual machine. The firmware or code may be in a format that may run natively in browsers, for example, the firmware may be a WebAssembly (WASM) module that can run, interpreted or compiled, sandboxed in the coordinator device 10, and may be capable of communicating with and/or using external services 62. The coordinator device 10 may comprise a WASM interpreter for interpreting the firmware. The sandboxing of a WebAssembly module provides a security mechanism for separating or isolating the running of the firmware for a remote device from all other firmware. The sandboxing therefore helps to mitigate failures or software vulnerabilities from spreading.

The coordinator device 10 comprises communication circuitry 12 which is configured to connect the coordinator device 10 to one or more remote devices 22, 32. For simplicity, an arrangement whereby connection of the coordinator device 10 to a single remote device, being a first remote device 22, is described further below. The connection between the coordinator device 10 and the first remote device may be via a first data channel 30. The communication circuitry 12 is configured to receive remote device description data 28 for the first remote device 22 from the first remote device 22 via the first data channel 30, following connection of the first remote device 22 to the coordinator device 10. The remote device description data 28 for the first remote device 22 may comprise a registration message to enable registration of the first remote device 22. The remote device description data 28 may comprise one or more of vendor identification, model identification for the remote device and serial number of the remote device.

The communication circuitry 12 is configured to connect the coordinator device 10 to an application server 40 and to send a request for a remote device manifest 44 for the first remote device 22, based on the remote device description data 28 for the first remote device 22, to the application server 40. The coordinator device 10 may be connected to the application server 40 via a second data channel 42, which may be any type of network communication means. The communication circuitry 12 is configured to receive the remote device manifest 44 for the first remote device 22 from the application server 40 via the second data channel 42, in response to the request for the remote device manifest 44 for the first remote device 22.

The coordinator device 10 comprises a processor 18 which may be in the form of processing circuitry 18 which is configured to analyze the remote device manifest 44 for the first remote device 22 to determine if firmware 46 for the first remote device 22 requires retrieval or download from the application server 40.

The communication circuitry 12 is configured to receive the firmware 46 for the first remote device 22 from the application server 40 if the analysis of the remote device manifest 44 for the first remote device 22 indicates that firmware 46 for the first remote device 22 requires retrieval or download from the application server 40.

The coordinator device 10 comprises a memory 20 to store the firmware 46 for the first remote device 22. The memory 20 may be a volatile memory such as a cache memory allowing high-speed data access. The memory 20 for storing the firmware 46 of the first remote device 22 may be a defined memory storage area of the coordinator device memory 20.

The processing circuitry 18 is configured to enable execution of the firmware 46 for the first remote device 22 outside of the first remote device 22. In particular, in one embodiment, the coordinator device 10 itself may execute the firmware 46 of the first remote device 22. In an alternative embodiment, the coordinator device 10 may be configured to send the firmware 46 for the first remote device 22 to another coordinator device for execution. The other coordinator device may be a second coordinator device 10-2, which may be of the same form as coordinator device 10. In particular, the processing circuitry 18 of the coordinator device 10 may facilitate the firmware 46 to be sent to another coordinator device 10 or a remote server, for example a cloud server, for execution, in order to balance workload and/or provide access to external services 62.

Execution of the firmware 46 for the first remote device 22 invokes a module entry-point (if present) to initialize global variables, a predefined initialization function which is responsible for scheduling when process logic is to be executed, and the main logic which is, by default, called once after initialization.

It will be understood that the communication circuitry 12 may comprise circuitry that provides both input and output functions using one or more supported data channels, which may include an Inter-Integrated Circuit (I2C) serial computer bus, a Controller Area Network (CAN) bus, a Local Area Network (LAN), a Bluetooth Low Energy (BT-LE) personal area network, or any other network communication method.

Although embodiments described above provide for communication between the coordinator device 10 and a first remote device 22, and between the coordinator device 10 and an application server 40, it will be understood that separate communication circuitry 14, 16 may be provided in or at the coordinator device to enable these two functions. For example, the communication circuitry 12 may comprise first communication circuitry 14 configured to connect the coordinator device 10 to the first remote device 22 and to receive the remote device description data 28 for the first remote device 22 from the first remote device 22, and second communication circuitry 16 configured to connect the coordinator device 10 to the application server 40 and to send the request for the remote device manifest 44 for the first remote device 22, based on the remote device description data 28 for the first remote device 22, to the application server 40 and, in response to the request, receive the remote device manifest 44 for the first remote device 22 from the application server 40. In such an embodiment, the second communication circuitry 16 may be configured to receive the firmware 46 for the first remote device 22 from the application server 40 if the analyzing of the remote device manifest 44 for the first remote device 22 indicates that firmware for the first remote device 22 requires retrieval or download from the application server 40.

In the case where the communication circuitry 12 comprises separate first communication circuitry 14 and second communication circuitry 16 each of the first communication circuitry 14 and second communication circuitry 16 may comprise circuitry that provides input and output functions using one or more supported data channels as previously recited.

Figure 3:
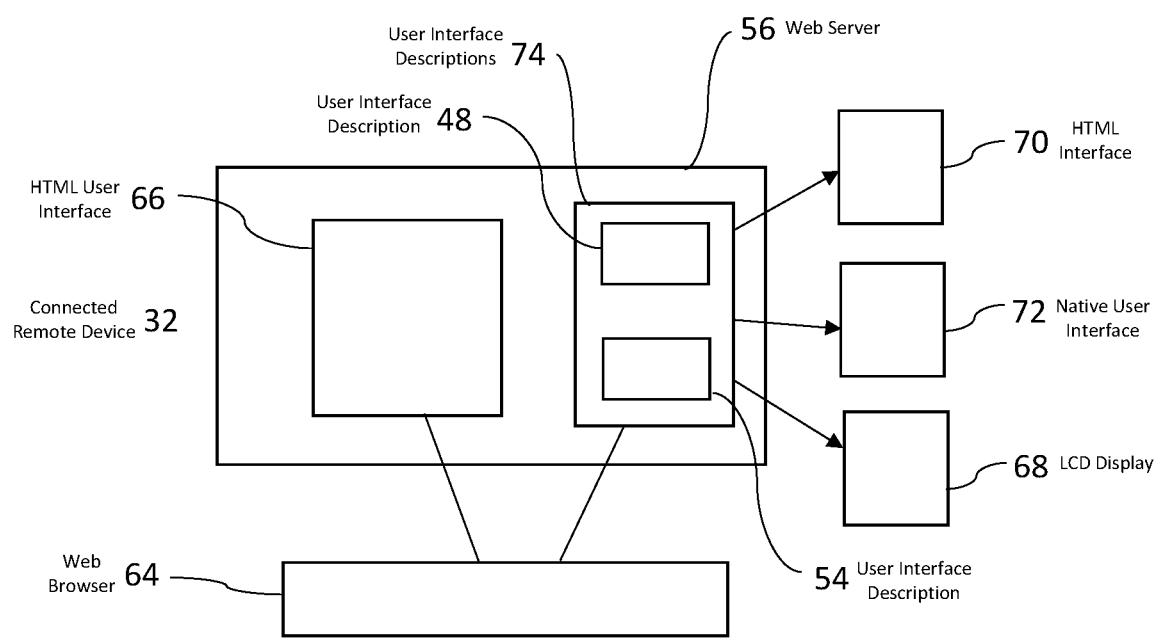
FIG. 3 illustrates a schematic diagram of a webserver element of an apparatus according to various examples.

Another aspect of the coordinator device 10 is to provide potential user interfaces for any remote devices 22, 32 that require them. The user interface for each remote device 22, 32 is declarative and media agnostic such that the elements and visual representation, or look, of the user interface, which can be provided by an application server in the form of a user interface description 48, 54, are defined but the interpretation and generation of the user interface is performed at an external device where the user interface is rendered. In an example, a JavaScript Object Notation (JSON) file that stores simple data structures and objects in JavaScript Object Notation (JSON) format can define a description of the user interface comprising the elements and visual representation, or look, of the user interface. The coordinator device 10 can expose a web server 56, as illustrated in more detail in FIG. 3, such that external devices 58, 60 can receive user interface descriptions 74 including, for example, the user interface description 48 for the first remote device 22 and the user interface description 54 for the second remote device 32 to render the user interface. The user interface descriptions, which may be stored in the memory 20 of the coordinator device 10 may be provided to the webserver 56. The user interface may be rendered in a web browser 64 outside of the coordinator device 10, or the coordinator device may host a HTML user interface 66.

In one example, the external device 58, 60 may be a wall mounted tablet 58 or a mobile phone 60 which may provide a HTML interface. By using declarative user interfaces the arrangement is scalable, in that it can be rendered as a fully featured HTML interface, which may have touchscreen features, or as a simple liquid-crystal display (LCD) 68, such as a low-cost two line LCD, with keyboard or similar user inputs. In another example, a mobile application or application on a fixed user station can render a HTML interface 70 or alternatively provide its native user interface 72. All remote devices 22, 32 connected to the coordinator 10 may then share a uniform integrated user interface regardless of their vendor.

In various embodiments, the processing circuitry 18 is configured to analyze the remote device manifest 44 for the first remote device 22 to determine if a user interface description 48 for the first remote device 22 requires retrieval from the application server 40.

The communication circuitry 12 is configured to receive the user interface description 48 for the first remote device 22 from the application server 40 if the analyzing of the remote device manifest 44 for the first remote device 22 indicates that the user interface description 48 for the first remote device 22 requires retrieval from the application server 40.

The coordinator device memory 20 is used to store the user interface description 48 for the first remote device 22.

While the above embodiments have defined the arrangement of the system 100 with regards to connection of a first remote device 22 to the coordinator device 10, it will be understood that any number of remote devices may be connected to a coordinator 10. Therefore, in some embodiments, in addition to the first remote device 22 being connected to the coordinator 10 via the first data channel, a second remote device 32 can be connected via the first data channel 30. Alternatively the second remote device 32 may be connected to the coordinator 10 via a different data channel.

In one embodiment, the communication circuitry 12 is configured to connect the coordinator device 10 to the second remote device 32 and to receive remote device description data 38 for the second remote device 32 from the second remote device 32. The processing circuitry 18 is configured to enable execution of firmware 52 for the second remote device 32 outside of the second remote device 32.

The firmware 52 for the second remote device 32, and the firmware of any other remote devices to be connected to the coordinator device 10, may be stored in the same memory 20 of the coordinator device 10 as the firmware 46 of the first remote device 22. A different memory storage area of the memory 20 may be used to store each different firmware for connected remote devices 22, 32.

In some embodiments, the coordinator device 10 is configured to send the firmware 52 for the second remote device 32 to another coordinator device for execution. The other coordinator device may be the same coordinator device as used to send the firmware 46 for the first remote device 22 to, that is the second coordinator device 10-2, or it may be a further coordinator device, for example a third coordinator device 10-3, which may be of the same form as the coordinator device 10.

The communication circuitry 12 is configured to connect the coordinator device 10 to the application server 40 and to send a request for a remote device manifest 50 for the second remote device 32, based on the remote device description data 38 for the second remote device 32, to the application server 40.

In response to the request for the remote device manifest 50 for the second remote device 32, the communication circuitry 12 may be configured to receive the remote device manifest 50 for the second remote device 32 from the application server 40.

Although in some embodiments the application server 40 which is used to send the request for the remote device manifest 50 for the second remote device 32 to may be the same application server 40 which is used to send the request for the remote device manifest 48 for the first remote device 22 to, in other embodiments the application server which is used to send the request for the remote device manifest 50 for the second remote device 32 to may be a different application server to the application server 40 which is used to send the request for the remote device manifest 48 for the first remote device 22 to. This different application server may be a second application server 40-2.

The processing circuitry 18 is configured to analyze the remote device manifest 50 for the second remote device 32 to determine if the firmware 52 for the second remote device 32 requires retrieval from the application server 40.

The communication circuitry 12 is configured to receive the firmware 52 for the second remote device 32 from the application server 40 if the analyzing of the remote device manifest 50 for the second remote device 32 indicates that firmware 52 for the second remote device 32 requires retrieval from the application server 40.

Then similarly to above with regards to the first remote device, the processing circuitry is configured to analyze the remote device manifest 50 for the second remote device 32 to determine if a user interface description 54 for the second remote device 32 requires retrieval from the application server 40. The communication circuitry 12 is configured to receive the user interface description 54 for the second remote device 32 from the application server 40 if the user interface description 54 for the second remote device 32 is determined to be required.

The user interface description 54 for the second remote device 32, and the user interface description of any other remote devices to be connected to the coordinator device 10, may be stored in the same memory 20 of the coordinator device 10 as the user interface description 48 of the first remote device 22. A different memory storage area of the memory 20 may be used to store each different user interface description for connected remote devices 22, 32. It should be understood that the memory utilized for storing the firmware 46 for the first remote device 22, the user interface description 48 for the first remote device 22, the firmware 52 for the second remote device 32, the user interface description 54 for the second remote device 32, and firmware and user interface descriptions of any other connected remote devices, may be the same memory or memory storage area or may be separate memory or memory storage areas on or in the coordinator device 10.

As illustrated in FIG. 2, a system 100 for controlling and/or coordinating the operation of remote devices 22, 32 may comprise a first remote device 22, optionally a further remote device 32 and additional remote devices, and a coordinator device 10 as described above.

In the system 100, the coordinator device 10 may be the first coordinator device of a plurality of coordinator devices 10. Having more than one coordinator device 10 allows for distributed processing which facilitates the balancing of workload and/or facilitates access to different external services 62. The workload can be transparently distributed between different coordinator devices 10. In various implementations of the invention one or more coordinator devices 10 may be used to coordinate a plurality of remote devices 22, 32. The remote devices 22, 32 need not be of the same type, or be from the same vendor. Remote devices 22, 32 of the same type may utilize separate instances of the same firmware, thus minimizing the requirement for the coordinator device 10 to obtain separate firmware from an application server 40 for each remote device 22, 32. The coordinator devices 10 may provide functions such as user interfaces, a real time clock, etc., and each connected remote device 22, 32 may be provided with such functionality via the coordinator devices 10. Because functions such as user interfaces and a real-time clock are provided via the coordinator devices 10, the functional requirements of the remote devices 22, 32 themselves are reduced allowing the remote devices 22, 32 to be comprised of less sophisticated components making them cheaper, easier to manufacture and less power consuming. System arrangements may comprise one or more application server 40 to provide device manifests, firmware, and device user interface descriptions to the coordinator devices 10. Each firmware can transparently use services exposed by each other firmware or the coordinator itself. So for example, an air conditioning system in a house may communicate with a house alarm to automatically start when the user arrives home. The air conditioning system may then check the opening status of any windows of the house, such that it can optimize energy consumption by controlling the opening and closing of the windows as necessary.

In a further example embodiment, a smart irrigation system comprises a coordinator device 10 connected to an application server 40. The coordinator device 10 exposes a minimal set of system calls that the firmware 46 of the first remote device 22 can use to discover external services 62 and to communicate with the external services 62. In addition, a few system functions are provided which allow scheduling of firmware execution and to communicate with the remote device 22. The following is a non-limiting example of firmware 46 for the smart irrigation system.

```
function on_mbed_execute( ){
const schedule=( )=>mbed.schedule_at(mbed.read_parameter("start"));
const soil_moisture=mbed.read_from_device( );
const minimum_soil_moisture=mbed.read_parameter("minimum moisture");
if (soil_moisture>=minimum_soil_moisture) {
return schedule( );
}
const weather=mbed.discover_service("weather-service")
.forecast("4 hours");
if (weather.includes("rain")) {
return schedule( );
}
mbed.write_to_device(true);
mbed.wait_for("1 hour");
return schedule( );
}
```

The remote device 22 of the smart irrigation example above is a soil moisture sensor. Upon execution of the firmware 46 at the coordinator device 10, a read function is executed and the soil moisture sensor 22 simply answers with the soil moisture level. The soil moisture sensor 22 considers each write function that is executed by the firmware 46 at the coordinator device 10 to be an on/off switch for the irrigation system. In some examples the soil moisture sensor may be connected directly to the coordinator using I2C such that the firmware running on the coordinator device 10 is the only element responsible for its operation. In this example the external service 62 that is called is a weather service function to obtain information on a weather forecast, the input from which can be used by the firmware 46 to assist in the decision whether to operate the irrigation system. Note that in the above example the initialization function has been omitted.

Figure 4:
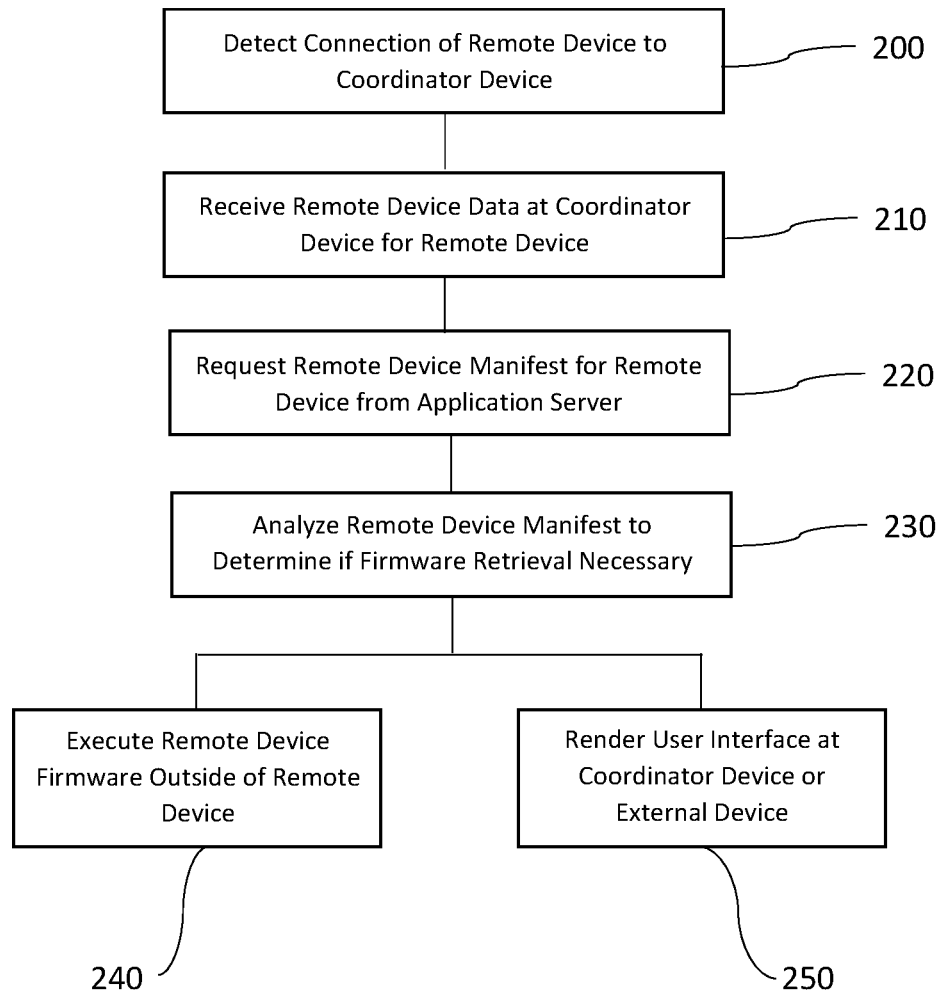
FIG. 4 illustrates a flow diagram of blocks of a method according to various examples.

The operation of the system 100 is described in the following paragraphs with reference to FIG. 4, and is described in relation to attachment of the first remote device 22 to the coordinator 10. It will be understood that the steps of the method may be repeated for further remote devices and/or coordinator devices.

At block 200, a connection of a first remote device 22 to a coordinator device 10 is detected. Detection of the connection of a first remote device 22 to a coordinator device 10 may be carried out at the coordinator device 10, which may be considered to be a controller or a server. In other embodiments an intervening device may detect the connection.

At block 210 remote device description data 28 is received for the first remote device 22 from the first remote device 22. The remote device description data 28 for the first remote device 22 is received at the coordinator device 10. The remote device description data 28 may be sent automatically when the first remote device 22 is connected to the coordinator device 10 or may be sent following a query from the coordinator device 10 to the remote device 22 upon detection of connection of the first remote device 22 to the coordinator device 10.

At block 220 a request for a remote device manifest 44 for the first remote device 22, based on the remote device description data for the first remote device 22, is sent to an application server 40 from the coordinator device 10. The request for the remote device manifest 44 for the first remote device 22 is received at the application server and validated at the application server 40. The validation may be performed or carried out through the use of key pairs or any other validation technique. Once the request had been validated the application server 40 sends the remote device manifest 44 for the first remote device 22 to the coordinator device 10. Therefore, in response to the request for the remote device manifest 44 for the first remote device 22, the remote device manifest 44 for the first remote device 22 is received from the application server 40 at the coordinator device 10.

At block 230 the remote device manifest 44 for the first remote device 22 is analyzed to determine if the firmware 46 for the first remote device 22 requires retrieval or download from the application server 40. The firmware 46 for the first remote device 22 is then received from the application server 40 if the analyzing of the remote device manifest 44 for the first remote device 22 indicates that firmware 46 for the first remote device 22 requires retrieval or download from the application server 40. In some cases relevant firmware 46 for the first remote device 22 may already be present at the coordinator device 10 and therefore not require retrieval or download from the application server 40.

Optionally at block 230, the remote device manifest 44 for the first remote device 22 may be analyzed to determine if a user interface description 48 for the first remote device 22 requires retrieval or download from the application server 40. The user interface description 48 for the first remote device 22 is then received from the application server 40 if the analyzing of the remote device manifest 44 for the first remote device 22 indicates that the user interface description 48 for the first remote device 22 requires retrieval or download from the application server 40. In some cases relevant user interface description 48 for the first remote device 22 may already be present at the coordinator device 10 and therefore not require retrieval or download from the application server 40.

At block 240 firmware 46 for the first remote device 22 is executed outside of the first remote device 22. In an embodiment the firmware 46 is executed on or at the coordinator device 10. In another embodiment the firmware 46 for the first remote device 22 may be sent to another coordinator device 10 for execution. The firmware 46 to be sent to another coordinator device 10 for execution may be sent from the coordinator device 10 to that other coordinator device 10, or the coordinator device 10 may facilitate identification of the first remote device 22 or the firmware 46 of the first remote device 22 to the other coordinator device 10 for that other coordinator device 10 to retrieve the firmware 46 from the application server 40 for execution at the other coordinator device 10. The firmware 46 may also be executed on a cloud server. By executing the firmware 46 on another coordinator device 10 or on a cloud server, the workload for operation and/or coordination of remote devices 22 can be balanced to optimize operation of the coordinator device 10 or a series of coordinator devices 10 in a system 100. The use of other coordinator devices 10 and/or cloud servers may also facilitate access to external services 62.

At block 250 the user interface can be rendered at the coordinator device 10, or the user interface description 48 can be provided to an external device 58, 60 to render the user interface.

The method can be repeated for a second remote device 32 when it is connected to the coordinator device 10 or to a system comprising the coordinator device 10.

Although, in the above embodiment, a request for a remote device manifest 44 for the first remote device 22 is requested from the application server 40, and the remote device manifest 44 for the first remote device 22 is analyzed to determine if firmware 46 and/or a user interface description 48 for the first remote device 22 requires retrieval or download from the application server 40, in other embodiments the coordinator device 10 may execute locally held firmware 46 and/or render a user interface for the first remote device 22, or facilitate execution of firmware 46 and/or the rendering of a user interface for the first remote device 22, once the remote device description data 28 has been received at the coordinator device 10. In such embodiments, retrieval and/or analysis of a remote device manifest 44 for the first remote device 22 may not be required. The present techniques may take the form of a computer program or computer program product embodied in a computer readable medium having computer readable program code embodied thereon. The computer readable medium may be a computer readable signal medium or a computer readable storage medium. The computer readable storage medium may be a non-transitory computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language).

The program code may execute entirely on the apparatus 10, partly on the apparatus 10 and partly on a remote computer or entirely on the remote computer or server. In the latter scenario, the remote computer may be connected to the apparatus through any type of network. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In one alternative, an embodiment of the present techniques may be realized in the form of a computer implemented method of deploying a service comprising steps of deploying computer program code operable to, when deployed into a computer infrastructure or network and executed thereon, cause said computer system or network to perform all the steps of the method.

In a further alternative, the preferred embodiment of the present techniques may be realized in the form of a data carrier having functional data thereon, said functional data comprising functional computer data structures to, when loaded into a computer system or network and operated upon thereby, enable said computer system to perform all the steps of the method.

It will be clear to one skilled in the art that many improvements and modifications can be made to the foregoing exemplary embodiments without departing from the scope of the present techniques.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

The invention claimed is:

1. A coordinator device comprising:
communication circuitry configured to:
connect the coordinator device to a first remote device,
receive remote device description data for the first remote device from the first remote device,
connect the coordinator device to an application server,
send a request for a remote device manifest for the first remote device, based on the remote device description data for the first remote device, to the application server, and in response to the request for the remote device manifest for the first remote device, receive the remote device manifest for the first remote device from the application server; and processing circuitry configured to enable execution of firmware for the first remote device outside of the first remote device.

2. The coordinator device according to claim 1, wherein the coordinator device comprises a memory to store the firmware for the first remote device.

3. The coordinator device according to claim 1, wherein the coordinator device is configured to send the firmware for the first remote device to another coordinator device for execution.

4. The coordinator device according to claim 1, wherein the processing circuitry is configured to analyze the remote device manifest for the first remote device to determine if the firmware for the first remote device requires retrieval from the application server.

5. The coordinator device according to claim 4, wherein the communication circuitry is configured to receive the firmware for the first remote device from the application server if the analyzing of the remote device manifest for the first remote device indicates that firmware for the first remote device requires retrieval from the application server.

6. The coordinator device according to claim 1, wherein the processing circuitry is configured to analyze the remote device manifest for the first remote device to determine if a user interface description for the first remote device requires retrieval from the application server.

7. The coordinator device according to claim 1, wherein the remote device description data comprises one or more of vendor identification, model identification and serial number.

8. The coordinator device according to claim 1, wherein the firmware is pseudo-code for an abstract virtual machine.

9. The coordinator device according to claim 8, where the firmware is a WebAssembly module.

10. A system comprising:
a first remote device; and
a coordinator device, the coordinator device comprising:
    communication circuitry configured to:
        connect the coordinator device to the first remote device,
        receive remote device description data for the first remote device from the first remote device,
        connect the coordinator device to an application server,
        send a request for a remote device manifest for the first remote device, based on the remote device description data for the first remote device, to the application server, and
        in response to the request for the remote device manifest for the first remote device, receive the remote device manifest for the first remote device from the application server; and
    processing circuitry configured to enable execution of firmware for the first remote device outside of the first remote device.

11. A method comprising:
detecting connection of a first remote device to a coordinator device;
receiving remote device description data for the first remote device from the first remote device;
detecting a connection of the coordinator device to an application server;
sending a request for a remote device manifest for the first remote device, based on the remote device description data for the first remote device, to the application server;
in response to the request for the remote device manifest for the first remote device, receiving the remote device manifest for the first remote device from the application server; and
executing firmware for the first remote device outside of the first remote device.

12. The method according to claim 11, comprising:
sending the firmware for the first remote device to another coordinator device for execution.

13. The method according to claim 11, comprising:
sending a request for a remote device manifest for the first remote device, based on the remote device description data for the first remote device, to an application server; and
in response to the request for the remote device manifest for the first remote device, receiving the remote device manifest for the first remote device from the application server.

14. The method according to claim 13, comprising:
receiving the request for the remote device manifest for the first remote device at the application server;
validating the request for the remote device manifest for the first remote device at the application server; and
sending the remote device manifest for the first remote device to the coordinator device.

15. The method according to claim 13, comprising:
analyzing the remote device manifest for the first remote device to determine if the firmware for the first remote device requires retrieval from the application server.

16. The method according to claim 15, comprising:
receiving the firmware for the first remote device from the application server if the analyzing of the remote device manifest for the first remote device indicates that firmware for the first remote device requires retrieval from the application server.

17. A non-transitory computer readable storage medium encoded with instructions that, when performed by a processor, cause performance of the method of claim 11.

* * * * *